Patented Aug. 14, 1923.

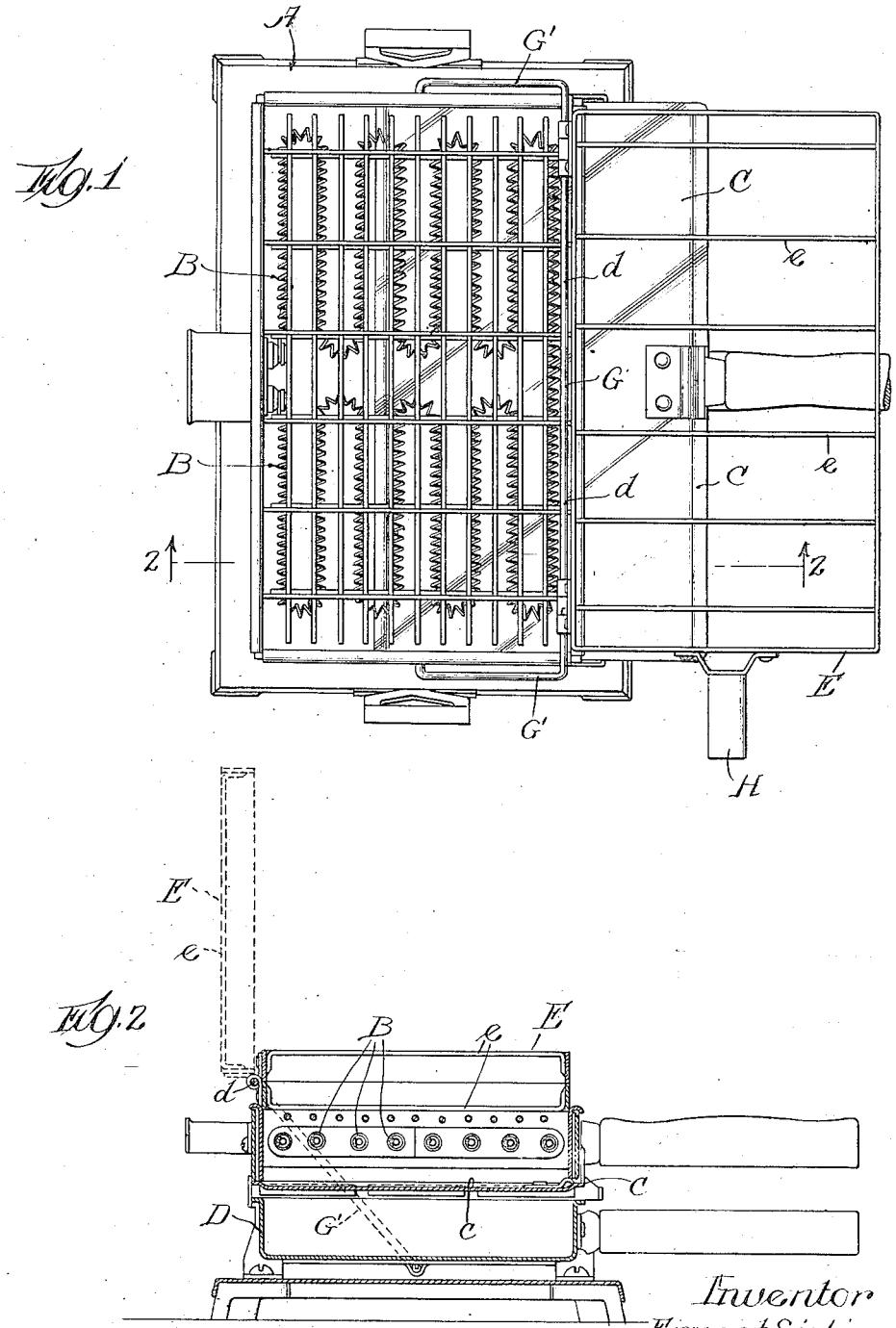

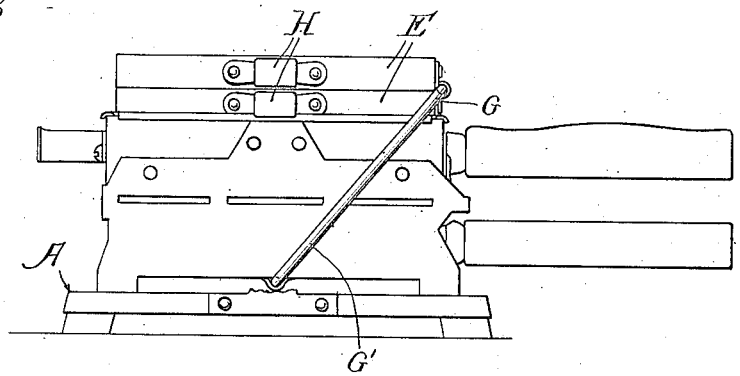
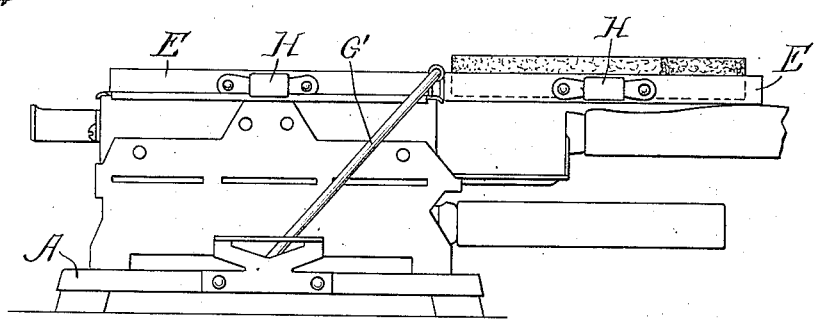
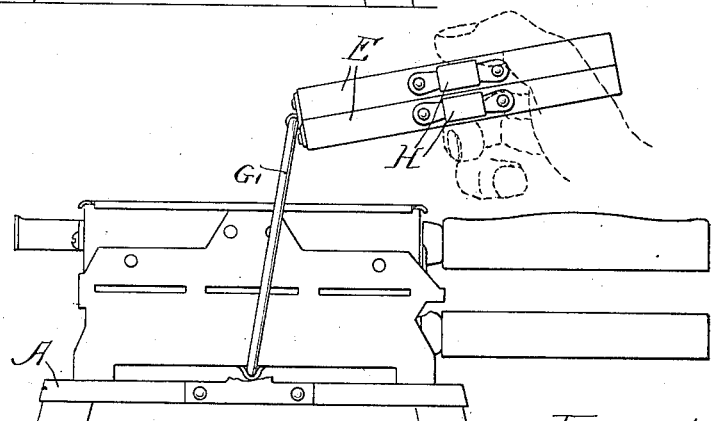

1,465,007

UNITED STATES PATENT OFFICE.

ERNEST SJOLIN, OF CHICAGO, ILLINOIS, ASSIGNOR TO CHICAGO FLEXIBLE SHAFT COMPANY, OF CHICAGO, ILLINOIS, A CORPORATION OF ILLINOIS.

ELECTRIC TOASTER.

Application filed March 9, 1922. Serial No. 542,207.

*To all whom it may concern:*

Be it known that I, ERNEST SJOLIN, a citizen of the United States, residing in the city of Chicago, in the county of Cook and the State of Illinois, have invented certain new and useful Improvements in Electric Toasters, of which the following is a specification, reference being had to the accompanying drawings, forming a part thereof:

The purpose of this invention is to provide an improved construction of a toaster or the like, particularly with a view to adapting it to be operated for reversing the toast to expose both sides to the heater without being obliged to touch it with the fingers and for inserting and removing the toast from the holder without exposure of the fingers of the operator to the heating element of the toaster. It consists in the elements and features of construction shown and described, as indicated in the claims.

In the drawings:—

Figure 1 is a plan view of a device embodying this invention with the toast holder out of toasting position.

Figure 2 is a section at the line, 2—2, on Figure 1, but showing the toast holder at reversed toasting position.

Figure 3 is an end elevation showing the parts in the position of Figure 2.

Figure 4 is a similar view showing the toast holder in full line unfolded for receiving a slice on the member of the holder which is not over the heating element.

Figure 5 is a similar view showing the toast holder in the process of reversal for turning the toast to present to the heater the opposite side from that which has already been exposed for toasting.

The structure illustrated in the drawings comprises a base, A, in which are positioned the heating coils, B. C is a reflector which slides into the base of the heater under the heating coils for deflecting the heat up through the coils onto the toast to be carried in the holder above said coils. D is a pan which is accommodated slidingly in the base below the reflector for any cooking purpose which it may serve, and designed to be used with the reflector lodged reversed on the top of the base above the heating coil for reflecting heat downward through the coil.

The characteristic feature of this invention is found in a toast holder which consists of a pair of open frames having cross rods, $e$, $e$, for retaining the slices to be toasted, said frame being hingedly connected at one lateral edge for folding together to enclose and hold the slice between the cross rods, respectively, above and below it. The hinge connection of the two frames to each other is also a hinge connection of them both as a unit to the base, and said hinge connection is itself pivotally mounted for swinging bodily from one side to the other of the base, thereby constituting a shiftable hinge, so that the two frames can unfold at either side of the base, and the holder which the two frames together constitute can be reversed bodily to present both sides of the toast to the heating coils. This complexity of function results from the form and mounting of the inverted U-shaped rocker, G, which has side arms, $G^1$, $G^1$, whose lower ends as pivoted to the base at a longitudinal line vertically below the longitudinal medial line of the plane of lodgment of the toast holder on the top of the base, and whose longitudinal connecting bar, $d$, is the pintle both of the hinge connection of the two frames, E, E, to each other, and also of the hinge connection to the base of the total toast holder, consisting of said two frames as a unit. By virtue of the rocker, G, having the lower ends of its side arms pivoted at $g^1$, on the base and being stopped on the base at either of its two laterally opposite positions, said rocker becomes the connection and immediate support of the toast holder on its ultimate support which is the base.

Upon considering the construction described, it will be seen that at one position the two frames folded together are lodged as a unitary toast holder, on the top of the base, exposing one face of the toast toward the heating coils, and that by swinging the rocker up toward erect position of the side arms, the holder may be turned over so as to present its opposite side toward the heating coils; and the rocker may be then lowered to the opposite side, lodging the reversed holder on the support. It will be seen also that the holder can be unfolded and folded for receiving and enclosing the slice, at positions entirely offset from the base, so that the operator is not obliged to expose himself to liability of burning his fingers by touching the hot wires of the holder or by proximity to the hot coils, in inserting, turning or removing the toast.

For manipulating the toast holder in folding, unfolding and reversing, as described, each frame, E, has a handle, H, at the middle of one end, and these two handles are thus coincident one above the other when the holder is folded together enclosing the toast; so that they are grasped as a unit for reversing the holder as a unit, or for carrying it as a unit off from the heater for opening it to remove the toast.

I claim:—

1. In an electric toaster and the like, in combination with a base and an electrically heated element for toasting, a two-part toast-holder comprising two reticulated frames hinged together at one edge for folding together to embrace the toast between them for exposure therethrough toward the heated element; hinge means for connecting the holder bodily to the base, and handle means for swinging the holder bodily about the last mentioned hinge to and from toasting position.

2. In the construction defined in claim 1, foregoing, the hinge connecting the two frames to each other being at the same side of the frame at which the holder is hinged bodily to the base.

3. In the construction defined in claim 1 foregoing, the hinged connection of the toast holder to the base comprising rocker arms pivoted to the base at a longitudinal line vertically below the medial longitudinal line of the area of lodgment of the holder upon the base, the holder being pivotally carried at the opposite ends of the rocker arms.

4. In the construction defined in claim 1 foregoing, the hinged connection of the toast holder to the base comprising a rocker consisting of side arms and a longitudinal connecting bar, the side arms being pivoted to the base at a longitudinal line of the area of lodgment of the holder on the base, the holder being pivoted to the longitudinal bar of the rocker.

5. In the construction defined in claim 1 foregoing, the means of connection of the toast holder to the base comprising rocker arms pivoted to the base at a longitudinal line vertically below the longitudinal line of the area of lodgment of the holder on the base, said holder being pivoted to the rocker arms at the same side at which its two frames are hinged together.

6. In the construction defined in claim 1 foregoing, the means of connection of the toast holder to the base comprising a rocker consisting of side arms and a longitudinal connecting bar, the side arms being pivoted to the base at a longitudinal line vertically below the longitudinal line of the area of lodgment of the holder on the base, the holder frames being hinged together on the longitudinal rocker bar, whereby the hinging of the holder as a unit to the base and the hinging of the frames to each other is accomplished by one and the same hinging means.

In testimony whereof, I have hereunto set my hand at Chicago, Illinois, this 3rd day of March, 1922.

ERNEST SJOLIN.